Patented Aug. 25, 1925.

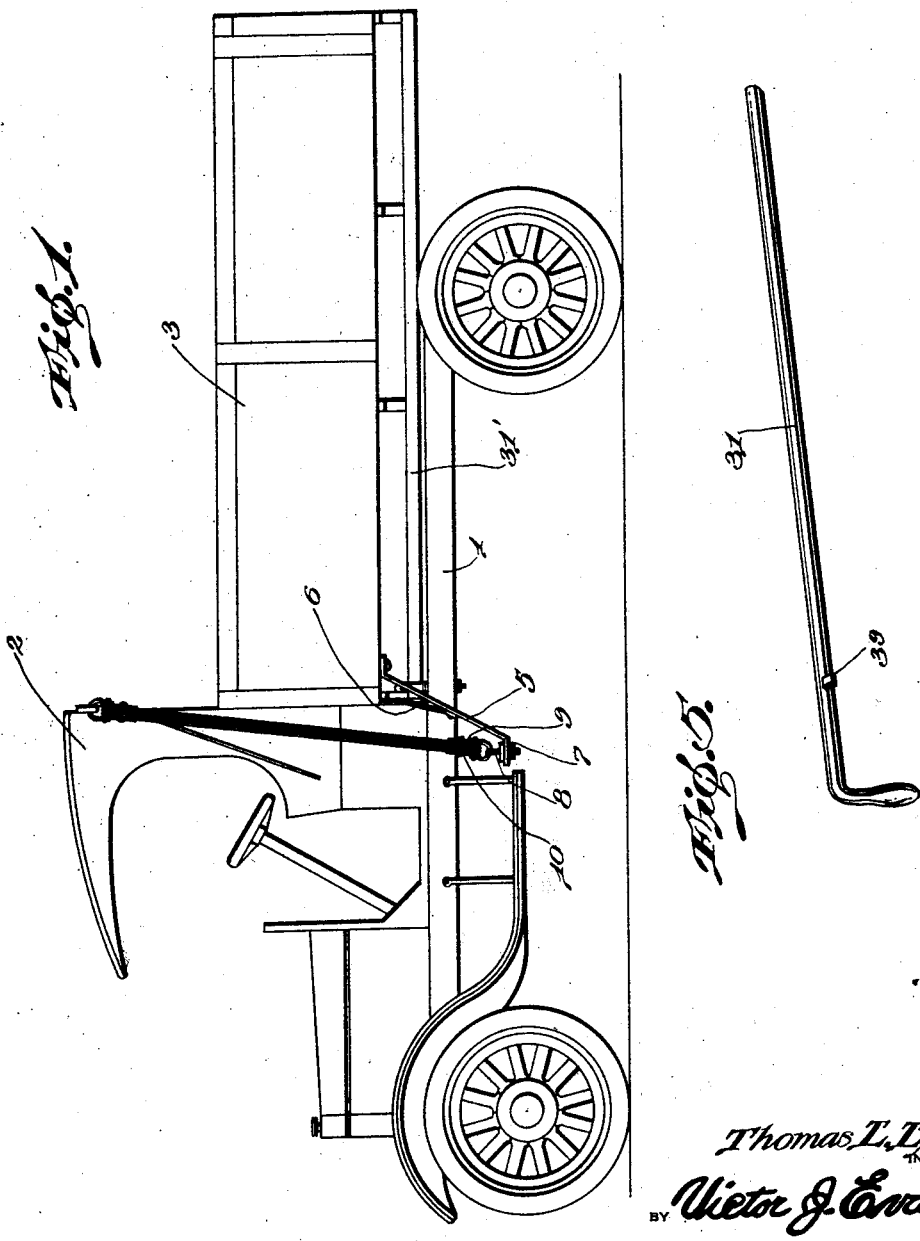

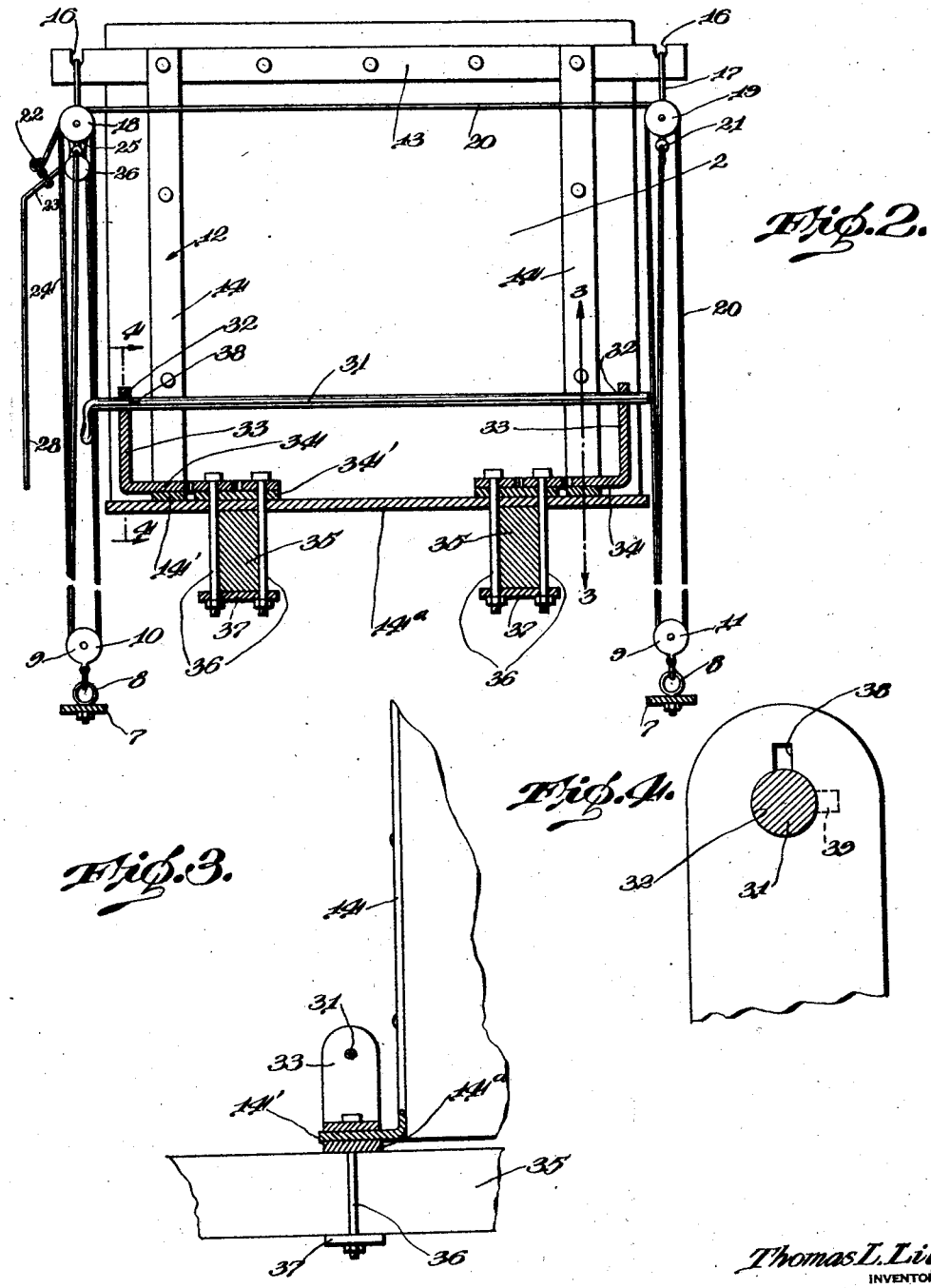

1,551,494

UNITED STATES PATENT OFFICE.

THOMAS L. LILLY, OF MINONK, ILLINOIS.

TRUCK HOIST.

Application filed July 10, 1922, Serial No. 573,823. Renewed July 14, 1925.

*To all whom it may concern:*

Be it known that I, THOMAS L. LILLY, a citizen of the United States, residing at Minonk, in the county of Woodford and State of Illinois, have invented new and useful Improvements in Truck Hoists, of which the following is a specification.

This invention relates to trucks, and an object of the invention is to provide means for facilitating the tilting of the dump body of the truck.

Another object of this invention is to provide a hoisting mechanism associated with a truck body adapted to be mounted on the chassis by any suitable means such as the improved hinged structure described in my companion application filed November 25, 1921, Serial No. 517,565, for converting a truck with an ordinary body into a dumping body truck.

Another object of the invention is to provide a simple practical structure embodying triple pulley blocks by means of which the front end of the truck body may be raised for tilting the body to dump the contents therefrom, and also to provide means for locking the front end of the truck body in its lowermost position to prevent accidental tilting of the body.

Other objects of the invention will appear in the following detailed description taken in connection with the accompanying drawing wherein:

Fig. 1 is a side elevation of a motor truck showing the improved hoisting mechanism applied.

Fig. 2 is a vertical cross section through the truck structure.

Fig. 3 is a detail section taken on the line 3—3 of Fig. 2.

Fig. 4 is a detail vertical section taken on the line 4—4 of Fig. 2.

Fig. 5 is a detail perspective view of the locking rod.

Referring more particularly to the drawing, the improved hoisting mechanism is shown associated with a motor vehicle truck including a chassis 1 and a cab 2. The bed or body 3 is mounted upon the chassis and is hingedly connected to rear end of chassis in any suitable manner so as to permit the bed or body to be tilted to facilitate dumping or emptying of its contents. A pair of arms 5 is attached to the body or bed 3 adjacent its forward ends, upon opposite sides of the bed, and these arms are braced by suitable braces 6. The forward ends 7 of the arms 5 are bent transversely to the major portion of the arms and to lie in horizontal planes. Swivel eyes 8 are connected to the flat forward ends 7 and they are connected to the brackets 9 of the triple blocks 10 and 11. A bracing structure 12 is carried by the rear side of the cab 2 and it comprises a horizontal cross bar 13 and uprights 14. The lower ends 14' of the uprights 14 are bent substantially at right angles to the uprights and rest upon what is known as a rest plate 14ᵃ. The rest plate 14ᵃ is supported upon the sills 35 of the chassis 1 as clearly shown in Figures 2 and 3 of the drawing for providing a braced support at the lower ends of the brace structure to assist in carrying the load occasioned by the tilting of the body or bed 3.

The cross bar 13 projects beyond the sides of the cab 2 and is provided with notches 16 which receive therein the clevises 17. The clevises 17 are connected to the brackets or bodies of the triple blocks 18 and 19 which are disposed above the triple blocks 10 and 11 respectively.

A rope or cable 20 has one end attached to a swivel 21 carried by the triple block 19 and this rope or cable 20 is threaded about the pulleys of the blocks 11 and 19 and passes from one of the endmost pulleys of the block 19 across the rear of the cab 2 and over the endmost pulley of the block 18. The end of the rope or cable 20 remote from the end which is attached to the swivel 21 is connected by means of a swivel 22 to the end 23 of the cable 24 which is threaded about the pulleys of the blocks 10 and 18. The swivel 22 is adjustable upon the rope or cable 24 and acts as an equalizer for connecting the ropes or cables 20 and 24 and equalize the raising of the forward end of the body or bed 3 of the truck structure permitting equal distribution of the power to both sides of the bed during the tilting thereof. The cable or rope 24 is attached to a swivel 25 carried by the bracket of the block 18 while its other end passes over a single block 26 and is attached to the swivel 22 and passes through the swivel, hanging downwardly to provide the end pulley 28 by means of which both ropes or cables 20 and 24 may be operated for raising the forward end of the truck body or bed 3. It will be understood that after the body is partly raised both the cables 20 and 24 will be grasped for continuing tilting movement of the body or bed.

A locking rod 31 is removably carried by brackets 33 which are provided with upstanding portions having openings for receiving the locking rod. The opening 32 in one of the brackets is provided with a keyhole extension 38 which is adapted to receive the key or projection 39 formed upon the locking rod 31 to permit the locking rod to be moved into locking position and when the rod is rotated slightly to bring the key 39 out of alignment with the opening 38 the key will prevent accidental unlocking movement of the rod.

The locking rod 31 is adapted to extend across and engage the sills 31' of the body 3 for preventing accidental tilting movement of the truck body or bed.

The locking rod 31 is made long enough to adapt it for use with vehicle bodies of various widths.

The brackets 33 have their horizontal attaching portions 34 adjustably resting upon the angled ends 14' of the uprights 14 and upon suitable spacing plates 34'. These adjustable attaching ends 34 are provided with a plurality of bolt receiving openings adapted to receive therethrough clamping bolts 36 which are arranged in pairs and cooperate with clamping plates 37 for securely clamping the rest plate 14ª, brackets 33 and uprights 14 to the sills 35 of the chassis. A plurality of sets of openings are provided for receiving the bolts 36 to permit lateral adjustment of the adjustable brackets to accommodate the type of truck body used and by the use of clamping bolts 36 and clamping plates 37 the entire assembly may be adjusted forward or backward along the frame of the truck chassis as necessary to accommodate different positions of sills which might otherwise prevent effective operation of the locking rod.

It is, of course to be understood that the invention may be constructed in various other ways and the parts associated in different relations and, therefore, I do not desire to be limited in any manner except as set forth in the claims hereunto appended.

Having thus described my invention what I claim is:

1. The combination with a truck including a chassis, a cab, and a tilting body, of uprights, a resting plate adjustably resting upon said chassis, said uprights having their lower ends angled and resting upon said resting plate, clamping plates and clamping bolts for adjustably clamping said resting plate against a portion of said chassis, a supporting cross bar carried by the upper ends of said uprights, arms attached to the forward end of the truck body and at its lower edge, and a block and tackle structure connected to said supporting cross bar and said arms.

2. The combination with a truck including a chassis, a cab, and a tilting body, of uprights, a resting plate adjustably resting upon said chassis, said uprights having their lower ends angled and resting upon said resting plate, clamping plates and clamping bolts for adjustably clamping said resting plate against a portion of said chassis, a supporting cross bar carried by the upper ends of said uprights, arms attached to the forward end of the truck body and at its lower edge, a tackle consisting of pairs of pulley blocks connected by a running cable, anchoring clevises carried by said pulley blocks, certain of said pulley blocks being supported from said cross bar and certain other of said pulley blocks being connected to said arms.

3. The combination with a truck including a chassis, a cab, and a tilting body, of uprights, a resting plate resting upon said chassis, said uprights having their lower ends angled and resting upon said resting plate, clamping plates and clamping bolts for adjustably clamping said resting plate against a portion of said chassis, a supporting cross bar carried by the upper ends of said uprights, arms attached to the forward end of the truck body and at its lower edge, a tackle consisting of pairs of pulley blocks connected by a running cable, anchoring clevises carried by said pulley blocks, certain of said pulley blocks being supported from said cross bar and certain other of said pulley blocks being connected to said arms, brackets having attaching arms adjustably resting against the angled ends of said uprights, said clamping bolts extending through said adjustable attaching ends, a locking rod adjustably carried by said brackets to prevent accidental tilting movement of said body, and means for preventing accidental unlocking movement of said rod.

4. The combination with a truck, including a chassis, a cab and a tilting body, of a supporting cross bar carried by the cab, arms attached to the forward end of the body at its lower edge, a tackle consisting of pairs of pulley blocks, each pair connected by a running cable, anchoring clevises carried by said pulley blocks, certain of said pulley blocks being supported from said cross bar and certain other of said pulley blocks being connected to said arms, and an adjustable swivel equalizer connecting the ends of the cables with which each pair of blocks are threaded to permit equal distribution of power to both sides of the tilting body.

In testimony whereof I affix my signature.

THOMAS L. LILLY.